March 16, 1971 H. ZYGAN 3,570,051
APPARATUS FOR BIAXIALLY STRETCHING FOIL SHEETS OR WEBS
Filed July 3, 1968

INVENTOR.
HIERONYMUS ZYGAN

United States Patent Office 3,570,051
Patented Mar. 16, 1971

3,570,051
APPARATUS FOR BIAXIALLY STRETCHING
FOIL SHEETS OR WEBS
Hieronymus Zygan, Odenthal, Germany, assignor to
Farbenfabriken Bayer Aktiengesellschaft, Leverkusen,
Germany
Filed July 3, 1968, Ser. No. 742,310
Claims priority, application Germany, July 4, 1967,
F 52,851
Int. Cl. B29b *3/00;* B29c *15/00;* B29d *7/14*
U.S. Cl. 18—1                                                 4 Claims

ABSTRACT OF THE DISCLOSURE

An apparatus for biaxially stretching continuous web materials is disclosed wherein there is employed a plurality of holding devices having means to simultaneously and independently adjust the width of gaps in the holding devices necessary to permit passage therebetween of both a marginally reinforced portion and a foil portion of the web material.

---

Figure 1:
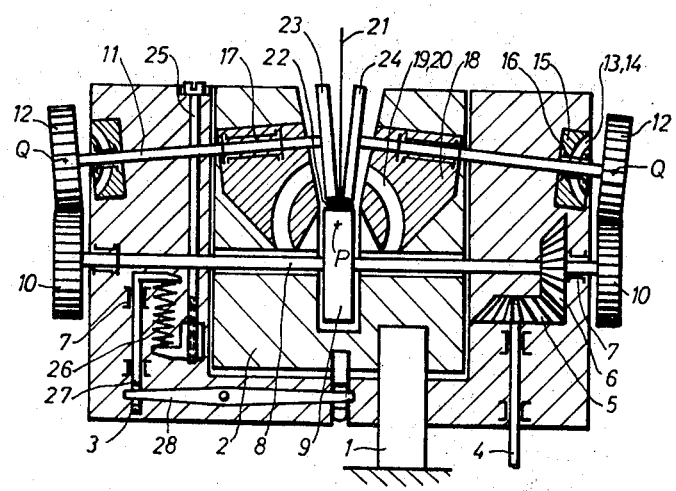

This invention relates to an apparatus for the manufacture of web materials and more particularly to an apparatus for biaxially stretching a continuously traveling sheet of thermoplastic synthetic resin.

It has been heretofore known to simultaneously and continuously biaxially stretch foil sheets or webs of thermoplastic materials such as synthetic resins, having a marginally reinforced or thickened edge portion, such as a beaded edged web material, by a process in which the forces required for stretching the webs are exerted mainly on the beaded edges in order to both prevent damage to the web which is generally rather sensitive to mechanical contact during the stretching process and to insure uniformity of the stretching process over the inner parts of the sheets or webs. A set of draw-off rollers generally may be provided to assist the longitudinal stretching action. Holding devices for holding the beaded edges have to be provided along each side of the opposite edges of the web material. These devices have been arranged either to move with the edges and thus with the web material, for example, clamps, or are arranged fixed in position.

Generally, biaxial stretching appartuses that operate with moving holding devices are by their nature only suitable for stretching in the transverse direction because, when a sheet or web is stretched in the longitudinal direction, for example, at a stretching ratio of about 1:4, the various holding devices, which are arranged as close together as possible on the unstretched foil, have to be distributed over the length of the stretched foil, in this case four times the original length, so that, at the end of the stretch zone, only one-quarter of the total length of the edge can be used to take up the transverse tensions produced as a result of the biaxial stretching operation. Stretching apparatuses having fixed holding devices do not have this disadvantage. These holding devices are arranged along the whole stretching zone, preferably at equal intervals, and only the time taken for the foil to pass through the apparatus changes. These arrangements are therefore highly suitable both for stretching the foil sheeting in the transverse direction and for stretching it in the longitudinal direction, and are therefore especially valuable for simultaneous continuous biaxial stretching of thermoplastic sheets.

The advantages of the fixed holding devices far outweigh the inconveniences due to the fact that the holding devices of such stretching apparatuses have to be constructed generally either as slide rails or as freely rotating wheels driven according to a desired predetermined plan. Generally, in the simplest case, they comprise a pair of ball bearings or wheels mounted one bove the other and obliquely to each other with a gap therebetween through which the foil portion but not the marginally reinforced or beaded portion of the web material can pass. By means of a plurality of such wheel pairs mounted together on rails extending in spaced relationship to one another and aligned on opposite sides of the web material, the web material is stretched in the transverse direction by the wheels and is at the same time moved continuously in the longitudinal direction. In order, however, to obtain a stretching process which is kinematically predetermined in detail as a function of the time lapse of the process and the correlation of the longitudinal and a transverse component, the wheels of each such holding device must be driven in a definite manner and be adjustable independently of the other wheels and must also be arranged to be transversely displaceable with respect to the direction of the web material independently of the wheels of each other holding device.

It has also been heretofore known that the holding devices suitable for this purpose advantageously generally each contain a set of wheels consisting of three wheels comprising one pair of obliquely positioned counter wheels and one contact pressure wheel, all the wheels being coupled together by intermeshing gear wheels and usually driven jointly from the outside. One characteristic of this type of known fixed holding devices, such as disclosed in U.S. Pat. No. 3,114,929, is that the gap which must be maintained between the two oblique counter wheels of the wheel set in order to enable the web material to pass through can be initially firmly adjusted according to the thickness of the foil directly adjacent to the edge of the web material. Since the stretched foil is thinner than the foil entering the stretching zone, the minimum distance required between the two wheels of a pair of counter wheels must be adjusted individually from one holding device to the other over the whole stretching region according to the extent to which the foil is expected to be thinned or has been determined to become thinner on biaxial stretching. This adjustment of the distance between the wheels of a pair which, although freely selectable, is fixed once it has been selected and thus entails numerous difficulties. If, as a result of irregularities or small faults in the production of the web material with the marginally thickened edge portion, the edge is stretched by more than the predetermined amount in the region of a holding device in which the wheels are still relatively far apart, the edge of the foil may slip out of the holding device, and this will interfere with further progress of the biaxial stretching operation and may even cause tearing of the foil. In any event, the web material must then be fitted back into the holding device of the stretching apparatus. Another disadvantage in the heretofore known continuous biaxial stretching apparatus occurs when web material requiring a high stretching ratio both in the longitudinal and in the transverse direction is processed. Since the thickness of the web material is in this case reduced by about the product of the longitudinal and the transverse stretching, the web material which has been produced, for example, by extrusion using a screw extruder with a flat sheeting die, must originally be of sufficient thickness to allow for the desired amount of stretching. This thickness, however, is generally much greater than the maximum distance that is permissible between the two wheels of a wheel pair at the feeding end of the stretching zone to ensure that the marginally reinforced portion there will still be held securely. The results in the unstretched foil being fitted with difficulty, if at all, into the holding device, and even then the holding devices will be subjected to unusually severe stresses. Moreover, the distance between the two wheels of each pair can only be readjusted individually each time there is a changeover from one stretching operation to another stretching operation in the longitudinal direction. Additionally, wheel sets constructed in this manner have the disadvantage that the engagement of the gear wheels required for coupling the three wheels also changes with the change in thickness of the clamped marginally thickened portion of the web material.

It is, therefore, an object of this invention to provide an improved apparatus for biaxially stretching a continuously traveling web which is devoid of the disadvantages and problems set forth above. It is a still further object of this invention to provide an improved apparatus for biaxially orienting thermoplastic web materials. It is a further object of this invention to provide an apparatus in which the gaps for passage of the web material adjust themselves automatically to the variations in the thickness in the foil material.

The foregoing objects and others which will become apparent from the following description taken in conjunction with the accompanying drawings are accomplished in accordance with this invention, generally speaking, by providing an apparatus for biaxially stretching a continuous traveling web material having a foil portion and a marginally reinforced edge portion which comprises passing said web material through a plurality of independently controlled holding devices, said holding devices being in spaced relationship to each other and aligned on opposite sides of said web material independent of the other pairs of holding devices, independently controlling the speed of the adjacent holding devices to correspondingly control the partial stretch ratio in the longitudinal direction between adjacent holding devices of said web material passing therethrough, independently controlling the force and distance between each pair of opposing holding devices positioned on opposite sides of the web material to correspondingly control the tension on said web material in the transverse direction and the amount of transverse stretch achieved by each pair of opposing holding devices and simultaneously and independently adjusting the width of gaps in the holding devices necessary to permit passage therebetween of both the marginally reinforced edge portion and the foil portion of the web material. Additionally, the objects of this invention are accomplished by an apparatus for biaxially stretching a continuous traveling web material having a foil portion and a marginally reinforced edge portion comprising a holding device having a driven means and two driving means adapted to receive and permit travel therebetween of a web material and having means to simultaneously adjust the width of a gap between the driven means and the two driving means necessary for passage therebetween of a marginally reinforced edge portion and also the width of a gap between the two driving means necessary for the passage therebetween of a foil portion of web material. More particularly, this invention relates to an apparatus for biaxially stretching a continuous traveling web material having a foil portion and a marginally reinforced edge portion wherein the web material is passed through a plurality of holding devices each including a driven means and two driving means having tread surfaces whereby the outer surface of the marginally reinforced edge portion is guided on the driven means and the tread surfaces of the driving means roll over the inner surfaces of the marginally reinforced edge portion adjacent the foil portion of the web material and wherein the width of a gap between the driven means and the two driving means necessary for the passage therebetween of the marginally reinforced edge portion and the width of a gap between the two driving means necessary for the passage therebetween of the foil portion of the web material is independently and simultaneously adjusted as a function of the thickness of the marginally reinforced edge portion of the web material. Still more particularly, this invention relates to the hereinabove described apparatus wherein the driven means of the holding device comprises a driven contact pressure wheel and the two driving means of the holding device comprise two driven, obliquely positioned counter wheels acting in opposition to the driven contact pressure wheel, the contact pressure wheel and the two counter wheels being mounted on two bearing members adapted to be displaceable relative to each other, that is, towards and away from each other. Preferably in each holding device of this invention the shaft of at least one counter wheel is fixed in a sliding member which is guided by means of a sliding arc in an arcuate groove of a bearing member, the geometrical center of curvature of said arc is situated outside the width of the web material, the shaft is loosely mounted on a second bearing member on which there is also mounted at least one end of a shaft which carries the contact pressure wheel and the other end the two shafts are coupled by two intermeshing gear wheels, one attached to each shaft.

Figure 2:
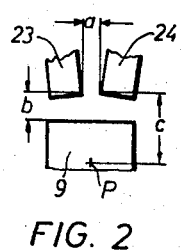
Figure 3:
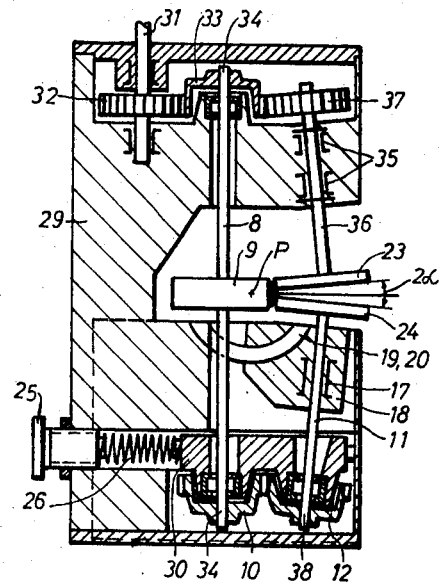

The apparatus of this invention will become more apparent in conjunction with the accompanying drawings in which like reference characters indicate like reference parts and in which FIG. 1 is a sectional view through an embodiment of a holding device in accordance with this invention, FIG. 2 is a diagrammatic view of a wheel set of a holding device in accordance with this invention, and FIG. 3 is a sectional view of a second embodiment of a holding device in accordance with this invention.

In FIG. 1 there is illustrated a holding device in accordance with this invention which consists of a first fixed bearing member 2 which is fixed by means of an arm 1 and a second bearing member 3 which is movable relative to bearing member 2. Bearing member 3 has journaled therein a shaft 4 which is connected at one end to a main drive (not shown), and at the other end is engagably connected, such as by bevel wheels 5 and 6, to a second shaft 8, which second shaft 8 rotates in bearings 7 and which second shaft 8 also carries a driven means 9, such as a contact pressure wheel. Gears, such as gear wheels 10, are arranged at the ends of the shaft 8 and mesh with gears, such as gear wheels 12, provided at the ends of shafts 11.

Grooves 13 in the form of circular arcs are formed in bearing member 3. These arcs have their center of curvature Q on the midline of the width of gear wheels 12. Sliding arcs 14 of slide members 15 which carry loose bearings 16 for shafts 11 engage in arcuate grooves 13. Each of shafts 11 is also mounted by means of a fixed bearing 17 in slide members 18, which slide members engage by means of sliding arcs 19 in corresponding circular arcuate grooves 20 of bearing member 2. The center of curvature P of circular arcuate grooves 20 and hence of the sliding members 18 must be situated outside the width of web material 21, substantially in the extension of the plane of the web material in order that two driving means 23 and 24, such as obliquely positioned counter wheels, may adjust their distance $a$ to each other automatically according to the thickness of the beaded portion 22 of web material at any given instant (FIG. 2) and moreover the adjustment should be such that the distance $a$ increases as a function of the increasing thickness $b$ of the beaded portion 22 at the edge of the web material. This automatic adjustment is effected in dependence upon the automatic adjustment of the distance between wheels 23 and 24 on the one hand and contact pressure wheel 9 on the other owing to the fact that these two adjustments are coupled together in the desired manner by the relative movement between bearing member 2 and second bearing member 3 and to the fact that shafts 11 are mounted both in bearing member 2 and in the second bearing member 3. A tensioning means 26, such as a spring, which is adapted to be tensioned by means of a screw 25, acts on a lever mechanism 27 and 28 to ensure that counter wheels 23 and 24 and contact pressure wheel 9 press sufficiently firmly against the surfaces of the beaded portion 22 which forms the edge of the web material.

The position of the different wheels in relation to each other is shown diagrammatically in FIG. 2, the distance between wheels 23 and 24 being indicated by reference $a$. The distance between contact pressure wheel 9 on the one hand and wheels 23 and 24 on the other is indicated by reference $b$. The distance between the center of curvature or center of rotation P of the circular arcuate grooves 19 and 20 and the points at which wheels 23 and 24 touch beaded portion 22 is indicated by the reference $c$.

Since center of rotation P of bearings 17 is not exactly at the mid-point of the shortest line joining wheels 23 and 24 but is situated further out in the direction of the contact pressure wheel 9, displacement of the second bearing member 3 parallel with first bearing member 2 causes the minimum distance $a$ between the wheels 23 and 24 to increase because the parallel displacement causes a rotation of slide members 18 and hence also of bearings 17. Distance $a$ would remain constant only if P were situated exactly on the line connecting the two most closely adjacent points of wheels 23 and 24. It is thereby possible according to the invention to adjust the distance $a$ of each wheel pair 23 and 24 as a function of the thickness $b$ of the beaded portion 22 existing at any particular moment at any position of wheel pair 23 and 24. Distance $a$ is in this way not directly determined by the thickness of the foil portion in this position, but since the reduction in the thickness $b$ of the beaded portion 22 progresses parallel with the reduction in the thickness of the foil portion as the degree of stretching increases, the distance $a$ necessary for the passage of foil portion is also a function of $b$, and the thickness of the beaded portion 22 is therefore suitable for adjusting distance $a$ indirectly by means of it.

Since bearings 16 for shaft 11, although rotatable, are otherwise fixed in their connection with bearing member 3, gear wheel couples 10 and 12 remains firmly in engagement with each other even when the beaded portion 22 at the edge of the foil is thick and the wheels merely undergo slight tilting in relation to each other. In a preferred embodiment, the opening angle $2\alpha$ of wheel pair 23 and 24 is about 6° when the thickness of the beaded portion 22 was equal to 0, and about 9° when the thickness of the beaded portion 22 reaches its greatest value of about $b = 10$ mm.

Since the distance $a$ may amount, for example, to from 1 to 2 mm. and the distance $c$ may amount to from about 10 to 20 mm., the pull exerted by the web material transversely to the direction in which the web material is moving cannot directly exert a precise influence on the adjustment of the distance $a$. Indirectly, the pull of the web material exerts a certain force in the axial direction of wheels 23 and 24 by the wedge action of beaded portion 22 in conjunction with the lever arm, but this force merely causes a corresponding reduction in the contact pressure force transmitted from spring 26 to the beaded portion 22 by contact pressure wheel 9. This effect is insignificant if the dimensions of the arrangement are suitably chosen.

In FIG. 3, the holding device consists of a fixed bearing member 29 in relation to which a second bearing member 30 is movable. The driving force is transmitted from a main drive (not shown) to a gear wheel 33 which is arranged on one end of a first shaft 8 by way of a second shaft 31 and gear wheel 32. Shaft 8 which carries a contact pressure wheel 9 is rotatably mounted in a pivot bearing 34 in a bearing member 29. A gear wheel 37 which is arranged at one end of a shaft 36, which rotates in fixed bearings 35, meshes with a gear wheel 33, while the other end of the shaft 36 carries a counter wheel 23. The other end of shaft 8 is mounted in a pivot bearing 34 on the second bearing member 30 which is adapted to be displaceable relatively to the first bearing member 29 by means of a spring 26 and a tightening screw 25. A gear wheel 10 meshes with a gear wheel 12 which drives shaft 11 which is loosely mounted in a pivot bearing 38. A second, fixed bearing 17 of shaft 11 is arranged on a slide member 18 which engages by means of a sliding arc 19 in a circular arcuate groove 20 in the bearing member 30. The center of curvature P of the arc and groove is situated outside the width of web material substantially in the extension of the plane of the foil.

The apparatus of this invention is suitable for biaxially stretching all types of web materials of thermoplastic synthetic resins such as cellulose esters, regenerated cellulose, polyvinyl and polyvinylidene-type resins, nylon, rubber hydrochloride, polycarbonates, polyethylene and polystyrene films and other elastomeric or thermoplastic resins. Generally the biaxially stretching of this invention will be carried out at temperatures within the range of from about 10° C. to about 180° C. and where heating is desirable, the heat may be supplied by any suitable heating means known in the art such as, for example, electric resistance heaters, gas-type heaters in the form of burners disclosed beneath the web material, pipes carrying a heated liquid such as oil, infrared heaters such as lamps and the like.

Although the invention has been described in considerable detail for the purpose of illustration, it is to be understood that variations may be made therein by those skilled in the art without departing from the spirit of the invention and the scope of the claims.

I claim:

1. A holding device for biaxially stretching web material having a foil portion and a marginally reinforced edge portion comprising a driven means and two driving means, said driving means acting in opposition to said driven means, the driven means and the two driving means each being mounted in two separate bearing members displaceable relative to each other and comprising a first bearing member having an accompanying first bearing disposed therein and a second bearing member having an accompanying second bearing disposed therein, at least one driven means having a first shaft fixed in a sliding member guided by means of a sliding arc in a circular arcuate groove in one of said bearing members, the geometrical center of curvature of said arc and groove being situated outside the width of web material, said first shaft also being loosely mounted in said second bearing member, said second bearing member also having mounted therein at least one end of a second shaft which is connected to and carries said driven means, said first and said second shafts being coupled by two intermeshing gear wheels, one attached to each of said first and second shafts.

2. A holding device according to claim 1 wherein said first shaft is additionally fixed in a second sliding member guided by means of a second sliding arc in a second circular arcuate groove in said second bearing member, the center of curvature of said second arc and groove being situated on the mid-line of the width of the intermeshing gear wheel attached at the end of said first shaft.

3. The holding device of claim 1 wherein said driven means comprises a contact pressure wheel and said two driving means comprises two driven counter wheels rotating about oblique axes.

4. The holding device according to claim 2 wherein said driven means comprises a contact pressure wheel and said two driving means comprises two driven counter wheels rotating about oblique axes.

References Cited

UNITED STATES PATENTS

| | | | |
|---|---|---|---|
| 2,728,941 | 1/1956 | Alles et al. | 18—1 |
| 3,114,929 | 12/1963 | Zygan et al. | 18—1 |
| 3,138,824 | 6/1964 | Brown, Jr., et al. | 18—1 |

J. SPENCER OVERHOLSER, Primary Examiner

R. L. SPICER, JR., Assistant Examiner

U.S. Cl. X.R.

264—289